W. C. ULINE

TABLE FRAME

Sept. 6, 1932. Re. 18,591

Original Filed Aug. 17, 1928

INVENTOR.

Walter C. Uline.

BY Geuzp J. Ottsch

ATTORNEY.

Reissued Sept. 6, 1932 Re. 18,591

UNITED STATES PATENT OFFICE

WALTER C. ULINE, OF NAPPANEE, INDIANA, ASSIGNOR TO NAPPANEE LUMBER AND MANUFACTURING COMPANY, A CORPORATION OF INDIANA

TABLE FRAME

Original No. 1,832,673, dated November 17, 1931, Serial No. 300,281, filed August 17, 1928. Application for reissue filed May 13, 1932. Serial No. 611,192.

The invention relates to table frames, and more particularly to table corner constructions, especially for round cornered folding tables, and has for its object to provide a device of this character in which the table frame is preferably formed from adjacent rails connected to the opposite ends of a quadrant shaped corner member, the table frame being reinforced on its inner side by a corner brace, which brace also serves as a means for pivotally mounting the leg to the frame, and also as a means for spacing the foldable table leg from the frame, which brace thus serves a three-fold purpose.

A further object is to provide a device of this character in which the corner of the table frame is suitably reinforced and prevented from breakage by rough handling.

A further object is to provide a device of this character in which the member for spacing the table leg from the side of the frame is integrally formed with the corner brace.

A further object is to provide a device of this character in which novel means for pivotally supporting the table leg are provided.

A further object is to provide a device of this character in which the number of parts ordinarily employed in its construction is reduced to a minimum, thereby simplifying the construction and the assembly thereof, and thereby materially reducing the manufacturing cost.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
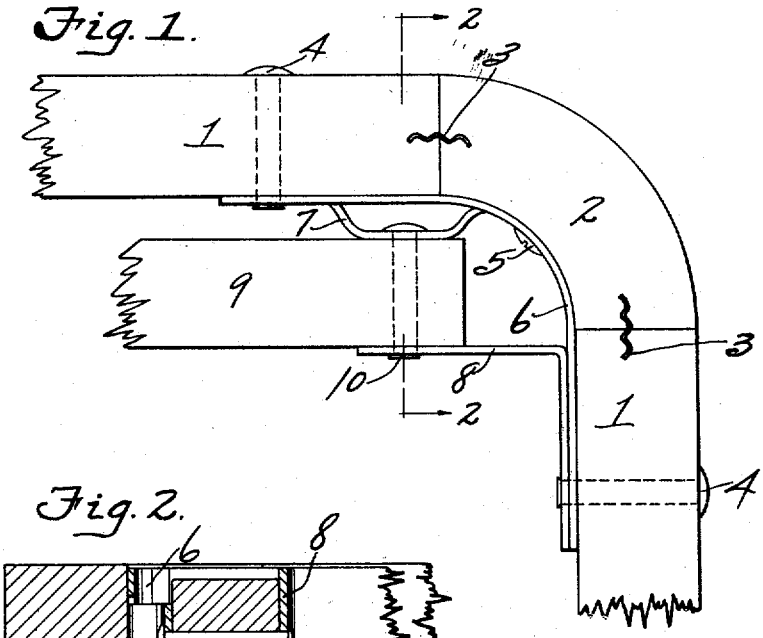
Figure 1 is a bottom plan view of the corner of the table frame as assembled.
Figure 2:
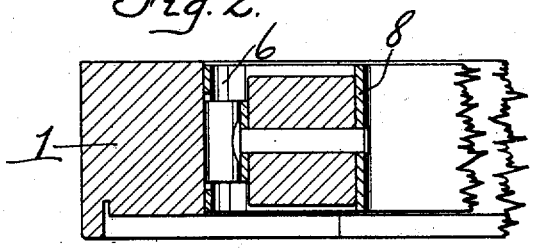
Figure 2 is a sectional view taken on line 2—2 of Figure 1.

Referring to the drawing, the numeral 1 designates the side rails of the table frame, to the adjacent ends of which are secured the quadrant shaped corner members 2 by means of the securing members 3. Secured to the inner sides of the rails 1 and the corner member 2 by means of the rivets 4 and the screw 5 is a corner brace 6. While the screw 5 is used in the preferred construction, it may be dispensed with, without impairing the strength and effectiveness of the structure, since the securing members 3 hold the corner member to the rails securely enough for all practical purposes.

The corner brace 6 conforms in shape to the shape of the inner side of the corner of the table frame, and supports the corner of the table frame so that if the table is roughly handled or is dropped, the table corner will not be broken or knocked out of place. Integrally formed with the corner brace 6 is the apertured off-set member 7, which is inwardly struck from the brace 6, and the purpose of which will be hereinafter set forth.

An apertured arm 8 is carried by one of the rails 1 in spaced relation with and parallel to the off-set member 7, and between them is pivotally disposed the table leg 9 mounted on the pivot pin 10 secured in the apertures in the off-set member 7 and the arm 8. Thus it will be seen that the off-set member 7 acts as a spacer to space the table leg from the rail 1, thus eliminating the separately formed spacers commonly used in table constructions and consequently reducing the number of parts used and simplifying the construction.

Figure 4:
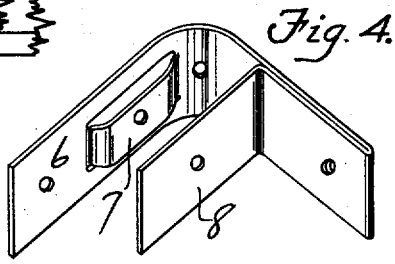
Figure 4 is a perspective view of a modified form of the corner brace.
Figure 3:
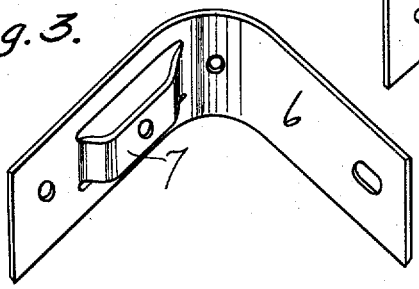
Figure 3 is a perspective view of one form of a corner brace.

In the modified construction shown in Figure 4, the corner brace 6, the off-set member 7, and the arm 8, are all integrally formed from a single piece of metal. By this construction great stability of the table leg is secured, and the danger of the rivet 4 loosening to allow the table leg 9 to sag is obviated. Another advantage resulting from the use of this construction is that fewer parts need be handled, and the cost and time ordinarily required to assemble the structure is materially reduced. Furthermore by this construction the functions of bracing the corner of the table, spacing the table leg from the rail of the table frame, and forming a pivotal support for the table leg are all performed by a single member.

From the above it will be seen that a table construction is provided in which the corners are well braced, the legs are properly spaced from the side rails, and the legs are properly pivotally supported; all of which functions are accomplished with a minimum of parts, and thus adapting the structure to quantity production with a material resultant lowering of the cost of producing the table.

The invention having been set forth, what is claimed as new and useful is:

1. The combination with a table frame corner comprised of adjacent frame rails and a quadrant shaped corner member secured to said rails, of a table leg, a corner brace secured to the inner side of said table frame and having bearing contact therewith throughout its length, an off-set member integrally formed with said brace, an arm carried by one of said rails, and means for pivotally supporting said leg between said off-set member and said arm.

2. The combination with a table frame corner comprised of adjacent frame rails and a quadrant shaped corner member secured to said rails, of a table leg, a corner brace conforming to the shape of said corner and secured to and connecting the inner sides of said rails and corner member, an off-set member formed in said brace, an arm spaced from said off-set member, said leg being disposed between said off-set member and said arm and a pivot pin carried by said off-set member and arm and passing through said leg.

3. The combination with a table frame corner comprised of adjacent rails and an arcuate corner piece, of a corner brace secured at its ends to said rails and being centrally bent to the radius of the inner side of said corner piece, an off-set member integrally formed with said brace, an arm carried by said frame in spaced relation to said offset member, and a table leg pivoted between said off-set member and said arm.

4. The combination with a table frame corner comprised of adjacent rails and a corner piece, of a corner brace secured to the inner side of the table to support said rails and said corner piece and having a spacer member integrally formed therewith, an arm spaced from said spacer member, and a table leg pivotally secured between said arm and spacer member.

5. The combination with a table frame corner comprised of adjacent rails and a corner piece, of a corner brace for said table frame, an off-set spacer member integrally formed with said corner brace, an arm carried by said table frame in spaced relation to said spacer member, and a table leg pivotally secured between said arm and spacer member, said corner brace having a shape conforming to the shape of the inner side of said corner and being secured to said rails and corner piece.

6. The combination with a round cornered table frame, a table leg, of a corner brace having a shape conforming to the inner side of the corner of the frame and secured thereto in face contacting relation throughout its length to support said corner, an off-set member integrally formed with said brace, an arm spaced from said off-set member to receive one end of the leg, said table leg being pivoted between said off-set member and arm.

7. The combination with a table frame corner comprising adjacent rails and an arcuate corner piece, of a corner brace secured to the inner side of said frame corner to support said corner piece relative to said rails, an arm spaced from one arm of said corner brace, a table leg pivoted between said arm and said brace, and means spacing said leg from said brace.

8. The combination with a table frame corner comprising adjacent rails and an arcuate corner piece, a table leg, of a corner brace conforming to the shape of and secured to the inner side of said frame corner to support said corner piece in operative position relative to said rails, said table leg being pivotally carried by said brace.

9. The combination with a round cornered table frame, a table leg, of a corner brace having a shape conforming to the inner side of the corner of the frame and secured thereto in face contacting relation throughout substantially its length to brace the corner of the frame, said brace having two arms at an angle to each other, an off-set member integrally formed with one arm of said brace and brought out and forming a leg support spaced from and substantially parallel the side of the frame along which extends the arm with which said off-set member is integrally formed, an arm extending out from the side of the frame along which extends the other arm of said brace and spaced from the off-set member to receive one end of the leg, said table leg being pivoted between said off-set member and said arm with the outer side of the pivoted end of the leg in spaced relation to the side of the frame along which extends the arm of the brace with which the off-set member is integrally formed.

10. The combination with a round cornered table frame, a table leg, a corner brace having a shape conforming to the inner side of the corner of the frame and secured thereto in face contacting relation throughout substantially its length to brace the corner of the frame, said brace having two arms at an angle to each other, an off-set member brought out and forming a leg support spaced from and substantially parallel the side of the frame along which extends one of the arms of said brace, an arm extending out from the side of the frame along which extends the other arm of said brace and spaced from the off-set member to receive one end of the leg, said table leg being pivoted between said off-set member and said arm with the outer side of the pivoted end of the leg in spaced relation to the side of the frame from which the off-set member is brought out to form the leg support.

In witness whereof, I hereunto subscribe my name this 10th day of May, 1932.

WALTER C. ULINE.